UNITED STATES PATENT OFFICE.

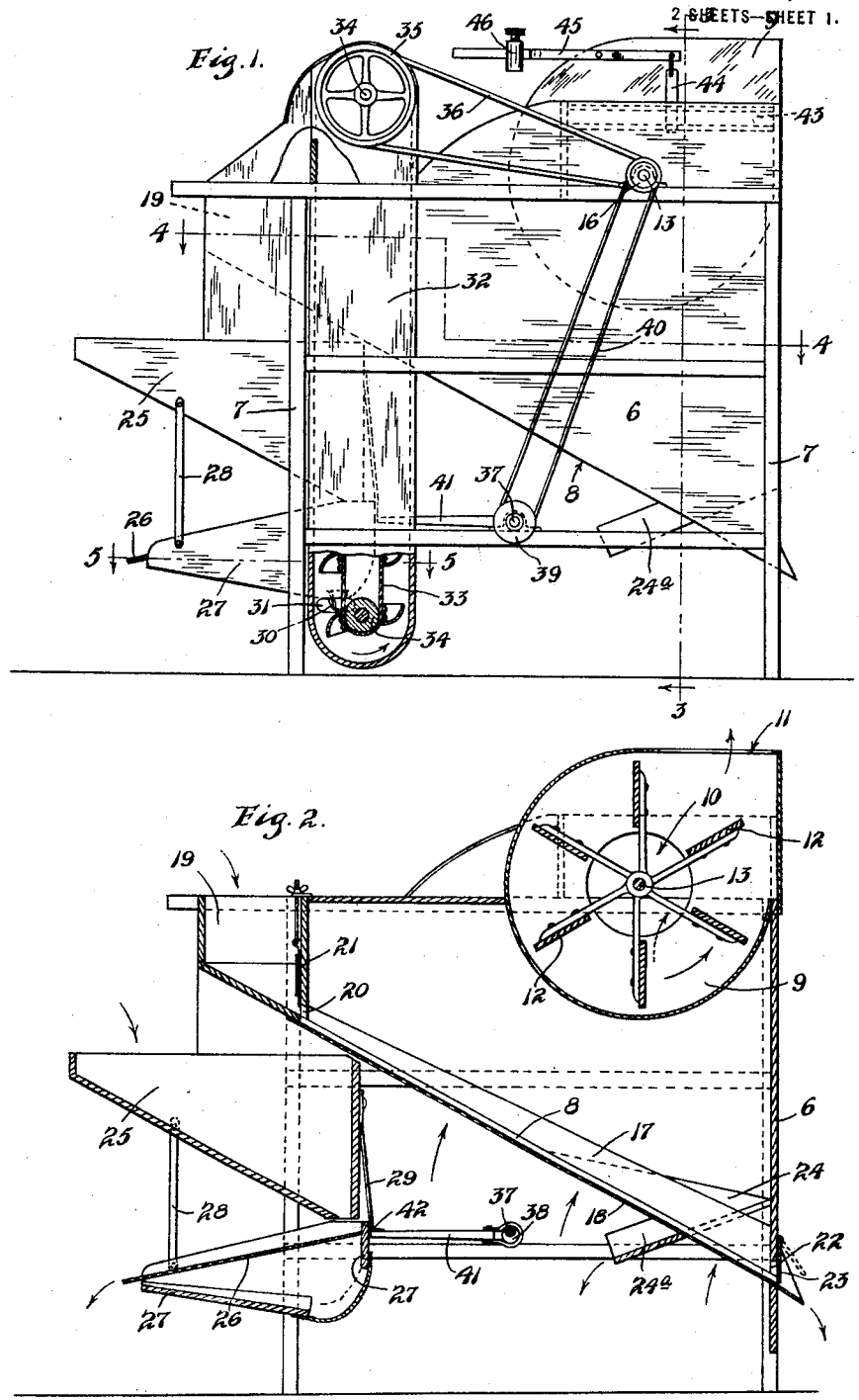

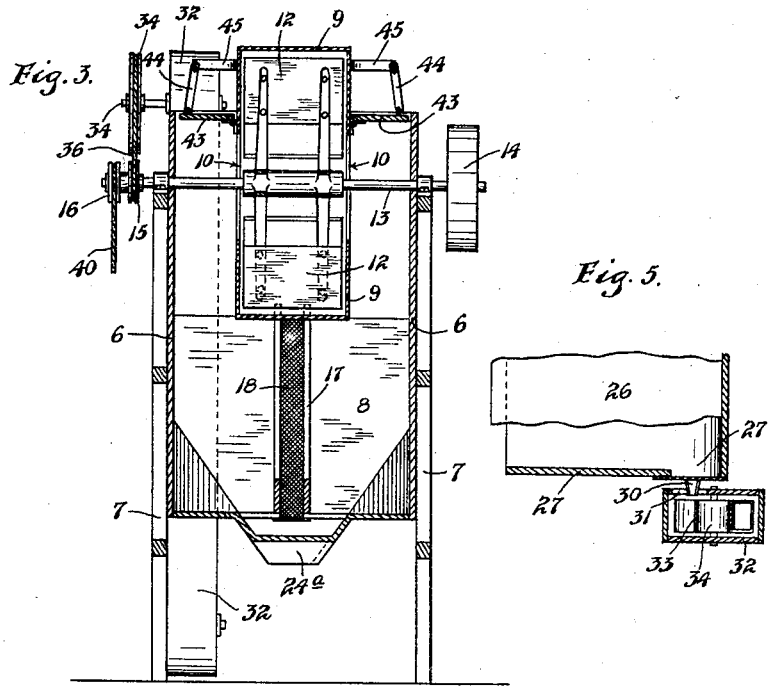
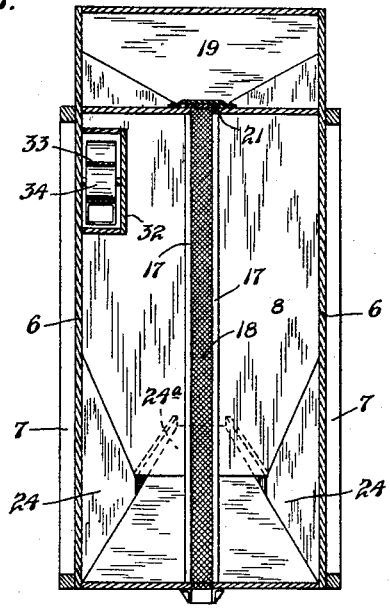

HENRY H. MEYER, OF RED WING, MINNESOTA.

GRAIN-SEPARATOR.

1,400,225.  Specification of Letters Patent.  Patented Dec. 13, 1921.

Application filed January 16, 1920. Serial No. 351,891.

*To all whom it may concern:*

Be it known that I, HENRY H. MEYER, a citizen of the United States, residing at Red Wing, in the county of Goodhue and State of Minnesota, have invented certain new and useful Improvements in Grain-Separators; and I do hereby declare the following to be a full, clear, and exact description of the invention, such as will enable others skilled in the art to which it appertains to make and use the same.

My invention relates to separators of the type generally designated as "fanning mills." This separator, while adapted for the separation of various different materials, is especially designed and particularly adapted for use in the separation of wheat and oats, chaff, dust, small seeds, and the like, and will be hereinafter referred to as used for this particular purpose.

This improved machine is illustrated in the accompanying drawings wherein like characters indicate like parts throughout the several views.

Referring to the drawings:

Figure 1 is a side elevation of the machine with some parts broken away;

Fig. 2 is a vertical section taken centrally through the machine from front to rear thereof;

Fig. 3 is a transverse vertical section taken on the line 3—3 of Fig. 1;

Fig. 4 is a horizontal section taken approximately on the line 4—4 of Fig. 1; and Fig. 5 is a fragmentary horizontal section taken approximately on the line 5—5 of Fig. 1.

The main body member of the machine is in the form of a closed casing 6 supported by a framework 7, and provided with a long inclined flat bottom 8. A fan casing 9 is secured on the main casing 6, is extended down into the same, but spaced from the sides of said casing 6 and provided with axial openings 10 that are in direct communication with the interior of the upper portion of said casing 6. The fan casing 10, as shown, has a discharge opening 11 at its top. Working within the fan casing 9 is a fan head 12, the shaft 13 of which is journaled in suitable bearings on the framework 7 and is provided at one end with a pulley 14, and at its other end with pulleys 15 and 16.

The inclined bottom 8 of the casing 6 is provided at its transverse center with an inclined longitudinal central chute formed by laterally spaced side strips 17 that rise above the said bottom 8. The bottom of the central chute 17 is of reticulate or perforate material, being preferably a screen 18 through which air can freely pass, but through which, wheat, oats, and the like, cannot pass. At its front end, the casing 6 is provided with a hopper 19 having a port 20 that will deliver directly into the upper end of the central chute 17. The port 20, as shown, is adapted to be closed or open, more or less, by a vertically adjustable gate 21, or other form of valve. At its lower end, the said chute 17 leads to a discharge port 22 in the back of the casing 6; and this port 22 is normally closed against the inflow of air, by a gravity-seated hinged gate or valve 23 that will freely open under pressure of grain accumulating at the lower end of the chute.

At the lower extremity of the inclined flat bottom 8, the casing 6 is provided with a hopper-like structure 24 having a forwardly inclined discharge spout $24^a$.

The commingled grain or materials to be separated will be delivered first into a primary hopper 25 that is rigidly secured to the framework 7 and is located under the hopper 19, which latter hopper, it may be here stated, serves as a sort of secondary hopper. The primary hopper 25 is arranged to deliver all of the stock onto the upper end of an inclined scalping sieve 26 carried by a vibratory hopper-like shoe 27. This shoe 27, as shown, is movably hung from the hopper 25, by links 28 and 29. The hopper-like bottom of the shoe 27 is provided at one side with a discharge spout 30 (see particularly Fig. 5), that works through a slot 31 in the lower portion of an elevator spout 32. This elevator spout 32 is rigidly supported by the framework 7, and a portion thereof is preferably extended through one side of the casing 6, so that it is set in flush with the side of the casing, (see particularly Figs. 3 and 4). The upper end of the elevator spout or leg 32 (see Fig. 1) is arranged to deliver into a secondary hopper 19.

Working within the elevator spout or leg 32 is a bucket-equipped elevator belt 33 arranged to run over upper and lower rollers 34, the shaft of the former being projected and provided with a pulley 35. A belt 36 runs over the pulley 35 and over the pulley 15 on the fan shaft 13, so that the elevator belt will be driven from the said fan shaft.

For vibrating the sieve shoe 27, there is a transverse shaft 37 journaled in suitable bearings on the framework 7 and provided with a crank or eccentric 38 and with a pulley 39. A belt 40 runs over the pulley 39 and over the pulley 16 on the fan shaft. The numeral 41 indicates a pitman or connecting rod, the strap of which works on the eccentric 38 and the extended end of which is connected to the rear portion of the shoe 27 at 42 by means of a hinge or other form of pivotal connection.

The casing 6, at its top, and preferably at each side of the fan casing, has air intake relief ports normally closed by hinged gates 43 connected by links 44 to levers 45 intermediately pivoted to any suitable support, such as a fan casing, and provided with adjustable weights 46. The weights 46, acting on levers 45, normally hold the gates 43 in their closed positions, as shown in Fig. 3.

Operation.

The operation of the separator above described, used for separating wheat and oats and other materials usually commingled therewith, is as follows:

The commingled stock is fed or delivered into the primary hopper 25 and will be delivered thereby onto the scalping screen 26, which latter is, of course, being vibrated when the machine is in action, and the fan in motion, the power being supplied by a belt, not shown, but which will run over the pulley 14.

The wheat, oats, small seeds and, in fact, all but the coarse materials, such as straw, chaff, and the like, will pass through the screen 26 to the hopper bottom of the shoe, and will be delivered into the lower portion of the elevator leg, while the straw, chaff and coarse materials will be delivered off from the lower end of the scalping screen 26.

The wheat, oats, small seeds, and more or less dirt delivered into the lower end of the elevator leg will, by the elevator belt, be carried upward and discharged into the secondary hopper 19, and from thence, will run through the port 20 into the central channel 17. The fan, under rotation will produce a suction or partial vacuum in the main casing 6, and this, of course, will cause air to be drawn upward into the casing through the perforate bottom of the central chute. When the suction from the fan is properly regulated, the air drawn upward through the bottom and central chute will lift, more or less, the entire stock in the chute, so that it will be air-sustained and floated downward in the chute, and, moreover, all relatively light particles, such as dust, small seeds and oats, either tame or wild, will be lifted out of the chute and carried laterally over the side boards thereof, and thus separated from the good wheat, which latter will not be lifted out of the chute, but will continue its downward movement therein until it is discharged through the port 22 at the lower end thereof.

Here it is important to note the relative arrangement and relation of certain of the parts best shown in Fig. 3, by reference to which it will be noted that the central chute 17 is not only centrally located in respect to the casing 6 but is centrally located under the fan casing and is much narrower than the fan casing; that the flat inclined bottom or slideway 8 of the casing 6 is much wider than the fan casing, is imperforate, and that the entire surface thereof delivers to a common spout or discharge device; and that the fan casing is centrally located over the inclined bottom 8, and on its opposite side, has air intake ports or eyes located in planes that are between the sides of the casing 6 and the sides of the central chute 17. In view of the above relative arrangement, the air drawn upward through the perforate bottom of the second chute, after passing above the said chute, is divided into two streams which are turned outward over the two inclined imperforate slideways afforded by the bottom 8, and thence moved upward to the eyes or intake ports of the fan. This causes the material, such as oats, which are considerably lighter than wheat, to be drawn out of the central chute and dropped onto the inclined slideways, while the very light particles, such as dust, some of the small seeds, and the like, will be carried through the fan and discharged from the fan by the air blast.

Under the above operation, highly efficient separation of wheat, oats, and the like, may, as has been determined in practice, be rapidly effected with a result that absolutely clean wheat may be delivered as the main product of the separation. The oats, with most of the foreign materials removed therefrom, will all run down the inclined slideways to a spout 24ª, from whence they will be discharged, separated from the wheat and from the dust, dirt and small seeds.

By properly adjusting the weights 46 on the levers 45, the relief gates 43 may be set so that they will remain closed when the suction or partial vacuum is at the maximum desired intensity, but will open and admit air to the main casing, and thus prevent the suction or partial vacuum from becoming so intense as to either cause the good oats to be carried into the fan, or the good wheat to be drawn out of the central chute.

What I claim is:

A grain cleaner having in combination, a casing having an inclined bottom and having an upwardly inclined trough extending therethrough and provided with a discharge chute at its lower end projecting out of said casing, discharge chutes at each side of said trough at its lower end oppositely directed to the said chute and adapted to discharge beneath the casing, a fan for drawing air upwardly through said trough and discharging the same at the top of the casing, a hopper at the upper end of said trough provided with feeding means leading into the trough, a primary material hopper disposed beneath the upper end of said casing and said first mentioned hopper for receiving the grain and material mixed therewith, a shoe provided with an inclined scalping means beneath the primary hopper and receiving therefrom and discharging the scalped material at its lower side, a chute beneath said shoe discharging laterally of the casing, and an elevating means at one side of the casing receiving from said last mentioned chute and discharging into the hopper at the upper end of said trough.

In testimony whereof I affix my signature in presence of two witnesses.

HENRY H. MEYER.

Witnesses:
G. F. HEMLEM,
L. D. MEYER.